Dec. 11, 1923.
J. W. BRINLEY
SIGNAL FOR MOTOR CARS
Filed Jan. 18, 1923
1,477,104
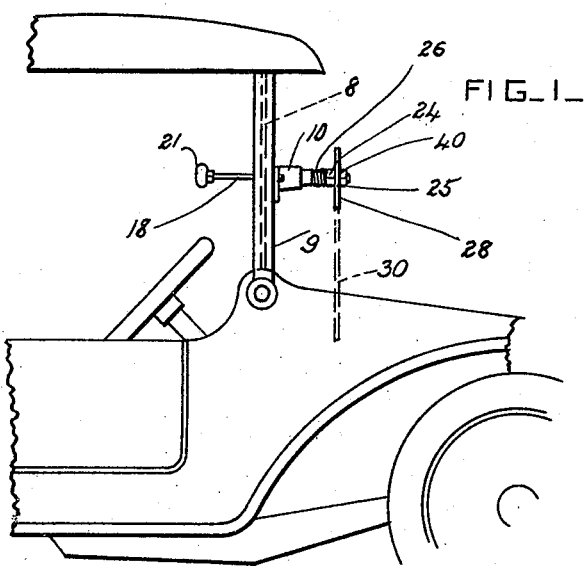
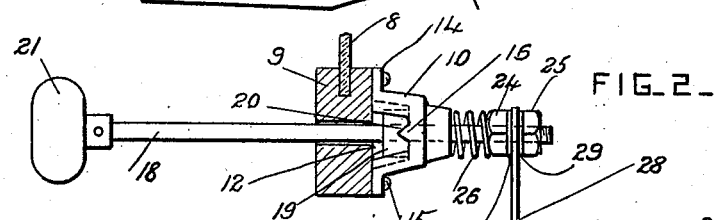
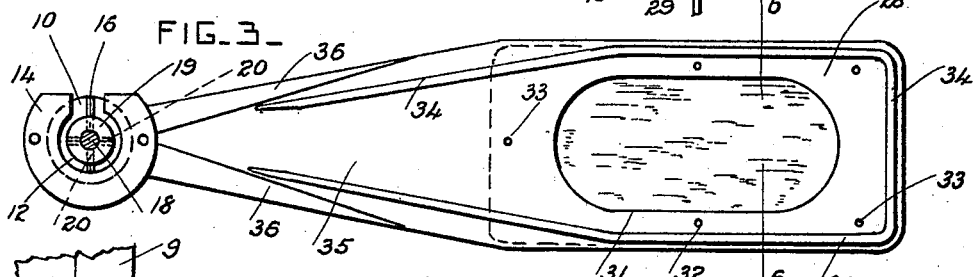
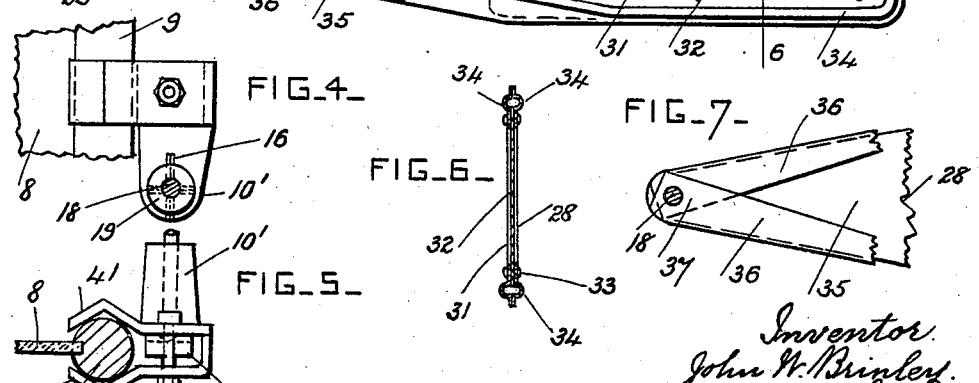
Inventor
John W. Brinley
by Herbert W. Jenner,
Attorney.

Patented Dec. 11, 1923.

1,477,104

UNITED STATES PATENT OFFICE.

JOHN W. BRINLEY, OF LINCOLN, NEBRASKA.

SIGNAL FOR MOTOR CARS.

Application filed January 18, 1923. Serial No. 613,445.

*To all whom it may concern:*

Be it known that I, JOHN W. BRINLEY, a citizen of the United States, residing at Lincoln, in the county of Lancaster and State of Nebraska, have invented certain new and useful Improvements in Signals for Motor Cars, of which the following is a specification.

This invention relates to signals adapted for use on motor cars to indicate when they are about to turn; and it consists of a movable semaphore arm supported by the wind screen of the motor car and adapted to serve as a signal when turned outwardly of the car, and also to serve as a glare shield for the driver when turned inwardly so that it overlaps the wind shield.

In the drawings, Figure 1 is a side view of a portion of a wind shield or screen provided with a semaphore device according to this invention. Fig. 2 is a plan view of the device. Fig. 3 is a detail front view of the supporting bearing showing the semaphore shaft in section. Fig. 4 is a detail front view of a modified form of supporting bearing provided with a clamp; and Fig. 5 is a plan view of the same. Fig. 6 is a cross-section through the semaphore arm, taken on the line 6—6 in Fig. 3. Fig. 7 is a detail of a portion of the semaphore arm.

The wind screen 8 is formed of glass, and is of any approved construction, and it is supported by similar uprights 9 or other supports in front of the seat in which the driver sits to drive the motor car.

A bearing 10 is secured to the wind screen support. In the form of the device shown in Figs. 1 and 2, this bearing has a chamber 12 formed concentric with it and provided with a flange 14 and a screw 15 for holding it in place. The chamber has a radial tooth 16 at one end of the bearing, and this tooth is triangular in cross-section. A shaft 18 is journaled in the bearing 10, and a collar 19 is secured on this shaft and is provided with radial notches 20 for engaging with the tooth 16.

An operating knob or handle 21 is secured on one end portion of the shaft 18. The other end portion of the shaft is screw-threaded, and has an inner nut 24 and an outer nut 25 screwed on it. A helical spring 26 is mounted on the shaft between the inner nut 24 and the adjacent end of the bearing, and operates to retain the shaft in any position to which it is turned.

A semaphore arm 28 is held between washers 29 on the shaft 18 between the nuts 24 and 25, and is arranged so that it may be turned to project laterally to the right or to the left of the shaft. When the semaphore arm is not required in use it is allowed to hang vertically, as indicated by the dotted lines at 30.

In order to permit the semaphore arm to be used as a glare screen for the driver, it is provided with an opening 31, and a sheet of colored translucent material 32 is secured in this opening. The semaphore arm 28 is formed of two thin sheets of metal secured face to face by rivets 33. Each sheet has a similar corrugation 34 pressed in it and extending around its edge, and also along its shank 35 radially of the shaft. The shank 35 is tapered, and one of the two plates has flaps or flanges 36 formed on the edge of its shank. These flaps are bent over the edge of the shank of the other plate, and over each other at the point 37 adjacent to the shaft. These flaps stiffen the shank, and thicken the end portion of it which is gripped between the two nuts.

The semaphore bearing is adjusted vertically so that when the semaphore arm is turned to project laterally and overlap the wind screen, the sheet of colored translucent material comes in front of the eyes of the driver, and protects them from the glare of the sun in the day-time, and from the glare of approaching head-lights at night.

When the semaphore arm is moved to project laterally in either direction, for use as a glare shield or to indicate that the motor car will make a turn, it is supported by the spring, so that the driver can operate the steering wheel with both hands. The driver does not have to retract the shaft in order to turn it, as the necessary retraction is effected by the inclined sides of the tooth and notches in the bearing and collar when the shaft is revolved.

The position of the semaphore arm when used as a glare shield is indicated by the full lines at 40 in Fig. 1.

The bearing 10' shown in Figs. 4 and 5 is clamped to the upright 9' by clamping jaws 41 and a bolt 42.

What I claim is:

1. A combined signal and glare shield, comprising a bearing provided with means for securing it to a wind screen, a shaft journaled in the bearing, a semaphore arm formed of a plate of opaque material having one end portion secured to the said shaft and having a sight opening in its other end portion, a sheet of colored translucent material secured over the said opening, and catch mechanism adapted to lock the said shaft to the bearing with the said arm turned outwardly clear of the wind screen for use as a direction signal and with the said arm overlapping the wind screen for use as a glare shield for the driver.

2. A car signal, comprising a bearing provided with means for securing it to a wind screen, a shaft journaled in the bearing and provided with a collar, said bearing and collar having a radial tooth and notches for holding the shaft stationary, two nuts screwed on the shaft, a spring interposed between one nut and the bearing and operating to hold the said tooth and notches in engagement with each other, and a semaphore arm secured between the two nuts and provided with an opening covered with colored translucent material and adapted for use as a signal and as a glare shield.

3. A car signal, comprising a bearing provided with means for securing it to a wind screen, a shaft journaled in the bearing and provided with a retaining catch, a semaphore arm formed of two sheets secured face to face and provided with tapering shanks which are secured to the said shaft, said shanks having similar corrugations extending around their edges and along their shank portions radially of the shaft, the shank portion of one sheet having also flaps which inclose the edges of the shank portion of the other sheet, and the said sheets having openings, and a sheet of colored translucent material clamped between the two sheets and covering their said openings.

In testimony whereof I have affixed my signature.

JOHN W. BRINLEY.